US007392833B2

(12) United States Patent
Geisel

(10) Patent No.: US 7,392,833 B2
(45) Date of Patent: Jul. 1, 2008

(54) LABELING DEVICE FOR MOVED OBJECTS AND METHOD OF LABELING MOVED OBJECTS

(75) Inventor: Alfred Geisel, Wehingen (DE)

(73) Assignee: Bizerba GmbH & Co. KG, Balingen (DE)

(*) Notice: Subject to any disclaimer, the term of this patent is extended or adjusted under 35 U.S.C. 154(b) by 481 days.

(21) Appl. No.: 11/127,653

(22) Filed: May 12, 2005

(65) Prior Publication Data

US 2005/0205192 A1 Sep. 22, 2005

Related U.S. Application Data

(63) Continuation of application No. PCT/EP03/11973, filed on Oct. 29, 2003.

(30) Foreign Application Priority Data

Nov. 14, 2002 (DE) ................................ 102 53 843

(51) Int. Cl.
*B32B 41/00* (2006.01)

(52) U.S. Cl. ......................... 156/366; 156/366; 156/367; 156/378; 156/379; 156/DIG. 44

(58) Field of Classification Search ................. 156/350, 156/352, 358, 360, 365, 366, 367, 368, 378, 156/379, DIG. 44
See application file for complete search history.

(56) References Cited

U.S. PATENT DOCUMENTS

| | | | |
|---|---|---|---|
| 4,683,707 | A | 8/1987 | Koyama |
| 5,232,539 | A | 8/1993 | Carpenter et al. |
| 6,009,926 | A | 1/2000 | Vicktorius et al. |
| 6,391,132 | B1 | 5/2002 | Kinnemann et al. |

FOREIGN PATENT DOCUMENTS

| | | | |
|---|---|---|---|
| DE | 32 03 162 | A1 | 8/1983 |
| DE | 196 42 110 | A1 | 4/1998 |
| DE | 199 52 375 | A1 | 5/2001 |
| EP | 0 090 631 | A2 | 10/1983 |
| EP | 0 846 074 | B1 | 6/1998 |

*Primary Examiner*—George R Koch, III
(74) *Attorney, Agent, or Firm*—Alston & Bird LLP

(57) ABSTRACT

To provide a labeling device for moved objects, comprising a stamp which is displaceably guided and by means of which a label is positionable on an object, with which a high reproducibility of the labeling operation on moved objects is achieved, a measuring device for detecting a stamp displacement time is provided, and the stamp displacement time is determined by the length of time of the movement of the stamp towards the object.

26 Claims, 5 Drawing Sheets

LABELING DEVICE FOR MOVED OBJECTS AND METHOD OF LABELING MOVED OBJECTS

This application is a continuation of International Application No. PCT/EP2003/011973 filed on Oct. 29, 2003.

The present disclosure relates to the subject matter disclosed in International Application No. PCT/EP2003/011973 of Oct. 29, 2003 and German Application No. 102 53 843.3 of Nov. 14, 2002, which are incorporated herein by reference in their entirety and for all purposes.

BACKGROUND OF THE INVENTION

The invention relates to a labeling device for moved objects, comprising a stamp which is displaceably guided and by means of which a label is positionable on an object.

The invention further relates to method of labeling moved objects by means of a stamp.

Such devices and methods are known, for example, from EP 0 846 074 B1 or from DE 199 52 375 A1.

SUMMARY OF THE INVENTION

In accordance with the invention, a labeling device and a method for labeling moved objects are provided, with which a high reproducibility of the labeling operation on the moved objects is achieved.

In accordance with the invention, a measuring device is provided for detecting a stamp displacement time, and the stamp displacement time is determined by the length of time of the movement of the stamp towards the object.

The stamp is usually moved via pneumatic cylinders. The exact sequence of movement of the stamp with respect to space and time is, therefore, not known. The exact positioning of a label is determined by the moved object and the stamp having to be synchronized with one another. An important parameter of this synchronization is the labeling time, namely the time required for the labeling. The speed of the moved object and the labeling time have to be coordinated when a label and, in particular, an adhesive label is to be attached at a defined position to the object.

The labeling time, in turn, is essentially comprised of a known system time and the stamp displacement time, which can only be vaguely estimated.

In accordance with the invention, provision is now made for the stamp displacement time to be measured, i. e., detected by the measuring device. The labeling time can thus be calculated exactly and, in turn, a high accuracy in the positioning of the label is achievable when the calculated labeling time is taken into account.

For example, provision may then be made for the stamp displacement time for a certain type of object (for example, a certain type of package) to be measured once and stored. When doing so the object may be at rest relative to a holding device for the stamp. If the stamp displacement time is then continuously measured during a labeling operation on the moved objects, an adaptation to changing conditions such as a change in the stamp movement due to temperature changes or slowly varying changes in the height of the object can be taken into account by a modified value for the stamp displacement time being stored accordingly.

Provision may also be made for the stamp displacement time to be newly measured following maintenance or repair work on the labeling device.

If objects of different height are fed in an unforeseeable sequence, the stamp displacement time can be determined for the respective objects by taking into account the height of the objects, and the stamp displacement time can then be taken into consideration in future labeling devices.

Highly accurate attachment of labels to the objects at the same position has also been achieved with the device according to the invention where there are variances in the height of the objects and the objects are fed at optional speeds.

With a knowledge of the measured stamp displacement time, it is also possible to set the impact energy of the stamp on the object. Furthermore, with a knowledge of the measured stamp displacement time it is possible to control the movement of the stamp in such a way that it does not remain seated too long on the object.

In particular, the stamp displacement time is determined by the length of time for the stamp to move from a starting position to the object. With the measuring device according to the invention this stamp displacement time can be measured, i. e., determined with high accuracy, without the movement equations of the stamp displacement having to be known. In particular, the starting position is a position in which the stamp receives a label, or an intermediate position, in which case the time required by the stamp to reach the intermediate position from the receiving position is known.

A labeling time is determined by the sum of a system time and the stamp displacement time. The system time which is comprised, for example, of system-related waiting times, a delivery time for labels to the stamp and a rotating time is system-dependent and, in principle, known. The unknown quantity in the labeling time, namely the stamp displacement time, is measured in accordance with the invention. The labeling time is decisive for the synchronization between the moved object to be labeled and the stamp, in order that a labeling operation can be started on time, if a label is to be positioned at a certain place on the object. Since the stamp displacement time is measured in accordance with the invention, the labeling time can thus be explicitly determined. In particular, the stamp displacement time is continuously measurable by the measuring device, so that changes in the stamp displacement caused, for example, by temperature changes or by slowly varying changes in height in the objects to be labeled may also be taken into consideration.

Furthermore, with the solution according to the invention it is possible to newly determine the stamp displacement time following changes in the mechanical system, for example, after maintenance work, repair work or piston exchange, in a simple way, so that reliable operation of the labeling is guaranteed.

In particular, provision is made for the measuring device to detect the stamp displacement time in a contactless manner so as to keep the wear and maintenance expenditure low.

It is advantageous for the measuring device to comprise a sensor device and a transducer device so as to achieve a high accuracy in the measurement of the stamp displacement time. A measuring range including, in particular, the possible linear path of movement of the stamp can then be defined by the sensor device or the transducer device.

In a variant of an embodiment, the sensor device and the transducer device are displaceable relative to each other so as to be able to carry out a time registration.

In particular, provision is made for the sensor device or the transducer device to be arranged stationarily in relation to a holding device for a stamp guide and for the transducer device or the sensor device to be displaceable with the stamp. It can thus be determined whether the stamp is still moving or has stopped. The stamp displacement time can, in turn, be determined as the length of time between a starting position of the stamp and the reaching of the object.

For example, the measuring device determines the stamp displacement time via magnetic coupling between sensor device and transducer device.

The transducer device then comprises, for example, a magnet, and the sensor device a plurality of Hall sensors, which couple with the magnet in a contactless manner. In particular, more that two Hall sensors are provided and are arranged along the possible path of movement of the stamp.

It is advantageous for the Hall sensors to be arranged in at least one row. The Hall sensors are then arranged in a row, in particular, so as to be aligned substantially parallel with a direction of displacement of the stamp. The extent of the row serves to define a measurement range. A measurement resolution is settable via the number of sensors in a row and/or via the number of rows.

In an embodiment of the invention, an evaluating device of the measuring device is connected such that signals of each individual Hall sensor are evaluatable. When the stamp then travels with the transducer device (in particular, a magnet) along the row and the Hall sensors successively supply a switching signal, the stamp displacement time can be determined in a simple and accurate manner.

It is then advantageous for the Hall sensors to be arranged in such a way that upon movement of the stamp, at least one Hall sensor always supplies a switching signal. It can thereby be reliably ascertained whether the stamp is still moving or at rest.

In particular, the Hall sensors are arranged and connected in such a way that signals associated with adjacent Hall sensors overlap with respect to time. This can be brought about by, for example, a monoflop. Owing to the overlapping with respect to time, an evaluation can be made, by means of which it is easily detectable that the stamp is at rest.

In particular, a time determination signal is then formed, which remains in the same switching state during the movement of the stamp. The time determination signal (interrupt signal) is then preferably brought into this switching state when the first Hall sensor of the sensor device supplies a switching signal and remains in this switching state until the sensor device detects no more movement of the stamp. The length of the time determination signal is then a measure of the stamp displacement time.

A plurality of rows of Hall sensors may also be provided, with the Hall sensors being arranged and connected in such a way that phase-shifted switching signals are generatable in different rows. In particular, the Hall sensors of a row are jointly connected, i. e., one row has an output connection which is allocated to all of the Hall sensors of the row. A high resolution is achievable via such rows, which generate phase-shifted signals in relation to adjacent rows.

Provision may also be made for sensor device and transducer device to be optically coupled with each other.

In an embodiment the transducer device is provided with a coding which is aligned along the direction of movement of the stamp and is readable by the sensor device.

The coding is preferably arranged stationarily in relation to the stamp so as to be able to detect movement of the stamp.

The coding advantageously has code fields which are arranged at a uniform distance. The code fields are formed, for example, by light/dark contrasts.

The sensor device then comprises optical sensors which react to such light/dark contrasts. Movement or rest of the stamp can then be detected in a simple way when the sensor device detects a change in contrast or no more change in contrast.

It is expedient for the sensor device to comprise two optical sensors which are arranged substantially at half of the distance of the code fields. A higher resolution is then achievable with low expenditure.

Provision may also be made for the transducer device to comprise a generator for a light field such as, for example, a light grid, with the stamp being immersible into the light field, and the light field being at least partially shieldable by the stamp in dependence upon the depth of immersion in relation to a sensor device. The depth of immersion can thereby be detected and, in turn, the stamp displacement time determined. By means of such a light field, the height of the object to be labeled can also be determined when the object moves into the light field. In particular, it can then be determined in a simple way when the stamp has reached the object. This is the case when stamp and object shield the light field to a maximum extent.

The shielding by the stamp is then determinable with respect to time by the sensor device.

A distance sensor may also be provided to measure the distance of the stamp from a holding device for the stamp. In particular, this distance measurement is carried out optically. It may, however, also be carried out inductively. From a change in the distance it can be detected whether the stamp is still in motion or at rest.

In accordance with the invention, in a method of labeling moved objects by means of a stamp, a stamp displacement time is measured as the length of time for the stamp to move from a starting position to the object.

The advantages of the method according to the invention have been discussed hereinabove in conjunction with the labeling device according to the invention.

Further advantageous embodiments have also been discussed hereinabove in conjunction with the labeling device according to the invention.

In particular, the labeling time, which designates the movement between the moved object to be labeled and the stamp and the positioning of the labels on the object, is determined as sum of a system time which is, in principle, known, and the measured stamp displacement time.

The determined stamp displacement time is stored and can then be used for future labeling operations, i. e., for the next objects.

Provision may be made for the stored stamp displacement time to be used to synchronize the stamp and the objects to be labeled. It is also advantageous for the stamp displacement time to be measured continuously. Changes in the stamp displacement caused, for example, by slowly varying changes in the height of the objects or by temperature changes, can then also be taken into consideration.

In particular, the measured stamp displacement time is used to set the impact of the stamp on the object. Furthermore, the determined stamp displacement time may be used to keep the time during which the stamp is seated on the object low.

The following description of preferred embodiments serves in conjunction with the drawings to explain the invention in greater detail.

DETAILED DESCRIPTION OF THE INVENTION

Figure 1:
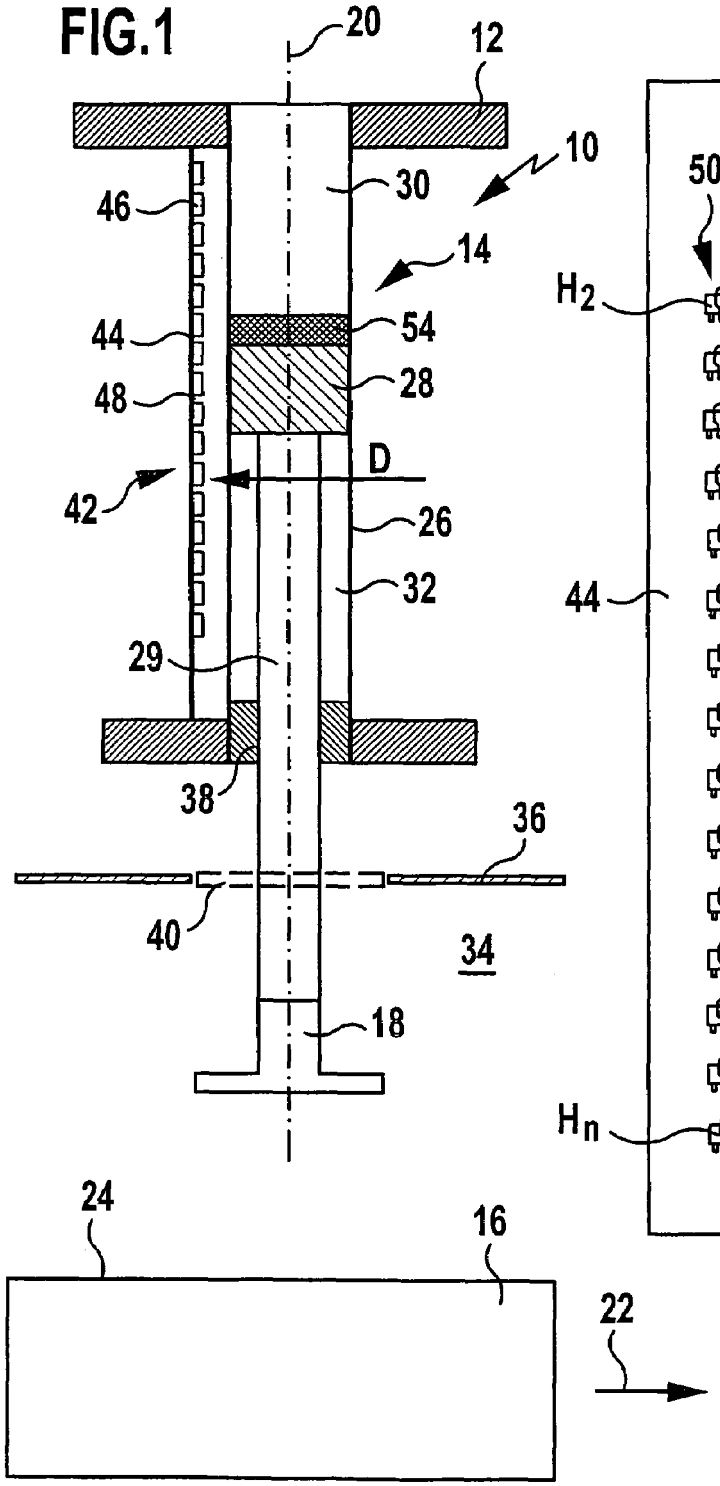
FIG. 1 is a schematic view of a first embodiment of a labeling device according to the invention.

A first embodiment of a labeling device according to the invention, shown in FIG. 1 and generally designated 10, comprises a holding device 12 which is stationarily positionable. A stamp device generally designated 14 can thus be positioned relative to a transporting device for moved objects 16. The transporting device (not shown in the drawings) comprises, for example, a conveyor belt on which the moved objects 16 are directed past the stamp device 14.

The stamp device 14 comprises a stamp 18 which is movable in a direction of displacement 20. The direction of displacement 20 lies transversely and, in particular, perpendicularly to a direction of transportation 22 for the moved objects 16. Labels are placeable on a surface 24 of the moved objects 16 by the stamp 18. The objects 16 are, in particular, product packages.

For moving the stamp 18, the stamp device 14 has a cylinder 26 in which a piston 28 is displaceable. The piston 28 is connected to the stamp 18 by a piston rod 29. There are formed in the cylinder 26 a first pressure chamber 30, which is delimited by the one end of the piston 28, and a second pressure chamber 32, which is delimited by the other end of the piston 28.

The two pressure chambers 30 and 32 are each provided with connections so as to be able to generate a positive pressure and a negative pressure, respectively, in these. If, for example, a positive pressure is generated in the first pressure chamber 30 and a negative pressure in the second pressure chamber 32, the stamp 18 is then thereby moved towards the object 16. If a positive pressure is generated in the second pressure chamber 32 and a negative pressure in the first pressure chamber 30, the stamp 18 is then moved away from the object. By alternating generation of positive pressure and negative pressure in the pressure chambers 30 and 32 the stamp 18 can be moved up and down and labels thus placed periodically on moved objects 16.

There is arranged in an area of movement 34 of the stamp 18 between the holding device 12 and the moved objects 16 a suction plate 36 at which the stamp 18 receives a label for depositing on the object 16. A starting position of the stamp 18 is thus defined by the suction plate 36, so that the stamp 18 has a defined starting position from which it can receive labels for placement on the moved objects 16 following movement towards these. This starting position 40 lies below a stop position of the piston 28 in the cylinder 26.

After the stamp 18 has received the label, rotation of the stamp 18 may be provided so as to position the label relative to the object 16.

Owing to a stamp guide 38 for the stamp 18, as the stamp 18 moves out further, possibly after a rotational movement, essentially only a linear movement is carried out between its starting position 40 and the position in which the object 16 to be labeled is reached.

The labeling time $T_E$ required for labeling a moved object 16 is comprised of a system time $T_{sys}$ and a stamp displacement time $T_S$. The system time $T_{sys}$ is due to known system-related waiting times and known times which are determined by the receiving of labels by the stamp 18 and its positioning therefor in the starting position 40 (including, for example, a rotation time for rotating the stamp 18).

The stamp displacement time $T_S$ is the time the stamp 18 requires to reach the object 16 in an extending operation from its starting position 40. In the embodiment shown, the starting position 40 is the position of the stamp 18 in which this receives a label. However, the starting position may also be an intermediate position, with the duration of the stamp movement from a receiving position to the intermediate position being known (as part of $T_{sys}$). Basically, this stamp displacement time $T_S$ is unknown. As the movement equations of the displacement of the stamp 18 are not known, this cannot be computed. In accordance with the invention, it is, for example, measured with an object 16 at rest. During a labeling operation on the objects 16 the stamp displacement time may change, as the stamp displacement may, for example, change on account of temperature changes or, for example, on account of reactions in the height of the objects 16, these then being small or slow changes in the height of the objects.

When objects 16 have different heights, a stamp displacement time of its own then basically applies for each object of a certain height.

In accordance with the invention, a measuring device 42 is now provided for determining the stamp displacement time $T_S$. The stamp displacement time $T_S$ can be continuously detected by this measuring device 42. It can be determined and stored for a certain type of object 16. During a labeling operation on a plurality of movable objects 16, the stamp displacement time $T_S$ may be adapted to changing conditions such as temperature changes or small variations in the height of the objects and the stored value corrected, for example, as the last valid mean value.

Figure 2:
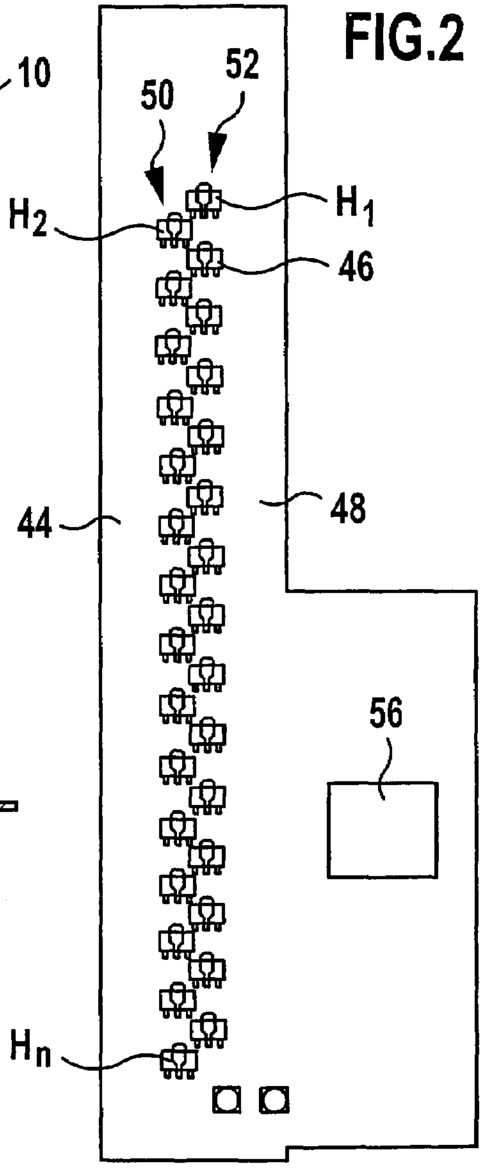
FIG. 2 is a plan view of the sensor device according to FIG. 1 in the direction D.

In a first embodiment of a measuring device 42 according to the invention, a sensor device 44 is provided (FIGS. 1 to 4), which comprises a plurality of Hall sensors 46 arranged on a printed circuit board 48 (FIG. 2). The Hall sensors are arranged in one or, as shown in FIG. 2, in two rows 50, 52. In these rows 50, 52 the Hall sensors 46 are respectively aligned parallel to the direction of displacement 20. The Hall sensors of the two rows 50, 52 are arranged in offset relation to one another, i. e., there is respectively seated between adjacent Hall sensors of row 52 and spaced transversely to the direction of displacement 20 a Hall sensor of row 50, so as to be able to accommodate a large number of Hall sensors $H_1$ to $H_n$ on the printed circuit board 48.

The sensor device 44 is arranged on the holding device 12.

A permanent magnet 54 displaceable with the piston 28 in the cylinder 26 is arranged as transducer on the piston 28.

When the stamp 18 moves out of its starting position 40 (its extending position) in the direction of displacement 20 towards the object 16, the magnet 54 then travels along the rows 50, 52 of Hall sensors 46 and due to the magnetic coupling with these generates a corresponding signal at the respective sensors.

There are such a number of Hall sensors $H_n$ provided that even in the lowest position of the stamp 18 (in the case of objects with the smallest height) it is still possible for a signal of the sensor device 44 to be generated as an indication that the object 16 has been reached.

The permanent magnet 54 is, for example, an axially magnetized disc magnet. The Hall sensors 46 ($H_1$ to $H_n$) may be bipolar sensors which switch independently of the direction in which the magnetic field impinges on them or unipolar sensors which only switch when the magnetic field impinges on them in a certain direction. Unipolar sensors may be arranged closer to one another and a higher resolution is thereby achieved.

There is arranged on the printed circuit board 48 an evaluating device 56 which evaluates the signals of the Hall sensors $H_1$ to $H_n$ in order to determine the stamp displacement time $T_S$.

Figure 3:
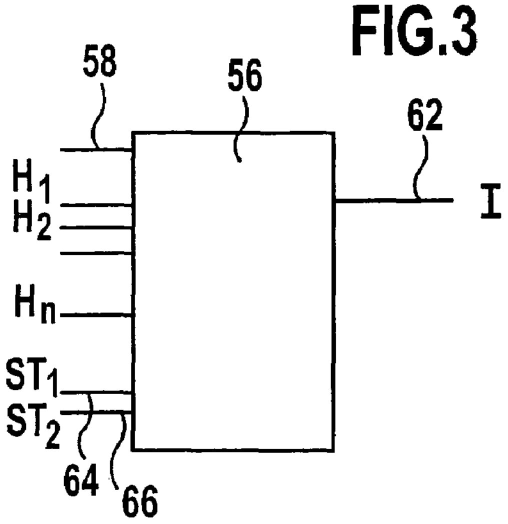
FIG. 3 is a schematic representation of the circuitry of an evaluating device of the sensor device according to FIG. 2.

In a first embodiment of a circuitry shown schematically in FIG. 3 each Hall sensor $H_1$ to $H_n$ is connected to the evaluating device 56 so that it can receive the switching signals of the individual Hall sensors 46.

The evaluating device 56 is connected via an enable signal line 58 to a microcontroller which can then activate the evaluating device accordingly.

When the magnet 54 moves along the Hall sensors 46, the Hall sensor respectively acted upon generates a switching signal which is delivered to the evaluating device 56.

It may be provided that in the case of a trailing edge 60 (FIG. 4) of the first Hall sensor $H_1$, which is arranged furthest from the suction plate 36, a retriggerable monoflop is triggered. During a measuring period for determining the stamp displacement time $T_S$, the trailing edge of a certain Hall sensor 46 triggers the monoflop only once. Each further trailing edge of the switching signals of the Hall sensors $H_2$ to $H_n$ triggers the monoflop anew.

When the stamp 18 comes to rest upon reaching the object 16, the monoflop then flips into its stable state and triggers an interrupt via an interrupt line 62. The time taken for triggering the interrupt is a measure of the stamp displacement time $T_S$.

The Hall sensors 46 are positioned so close together that the interrupt is only triggered when the stamp 18 is at rest.

Figure 4:
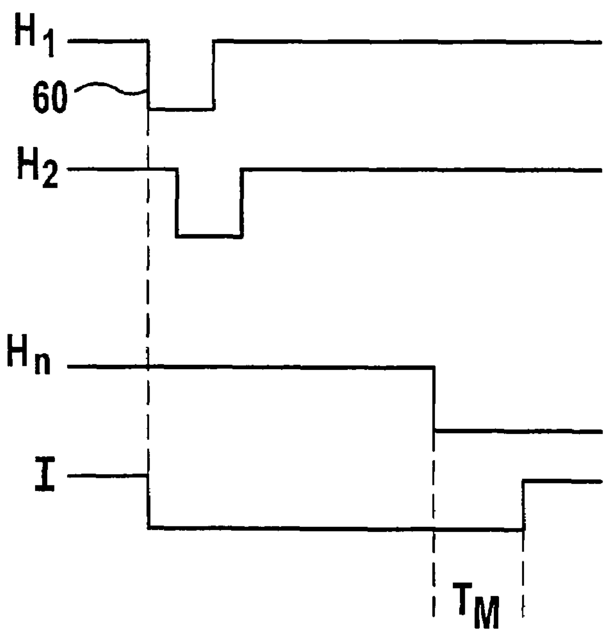
FIG. 4 shows the signal path with respect to time at the sensor device according to FIG. 2.

It may be that the measurement is inaccurate by a release time $T_M$ of the monoflop (FIG. 4). It is possible to set and, in particular, control the release time $T_M$ via control lines 64, 66. It is also possible for the evaluating device 56 to determine the release time $T_M$ itself and, in particular, in doing so to orientate itself by the time last measured between two switching edges of adjacent Hall sensors $H_i$ and $H_{i-1}$.

Figure 5:
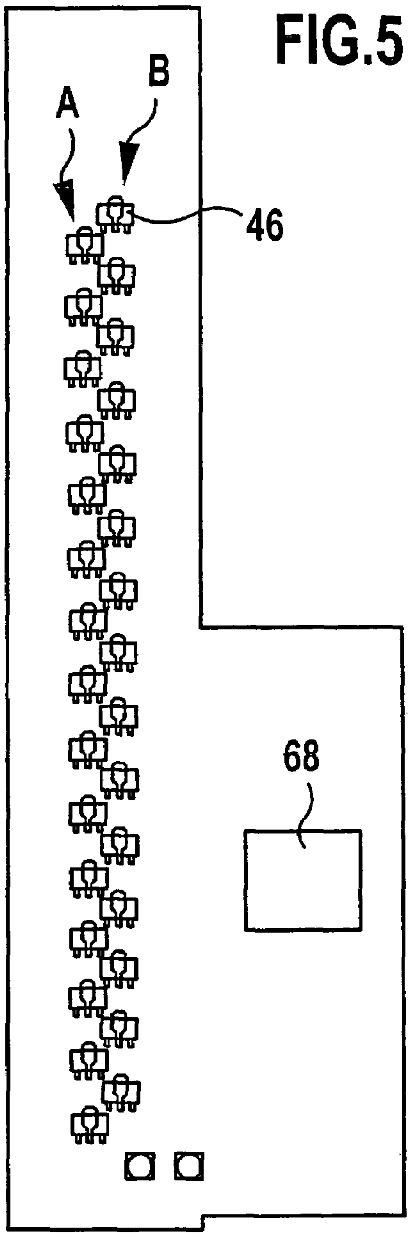
FIG. 5 shows a variant of a sensor device.
Figure 6:
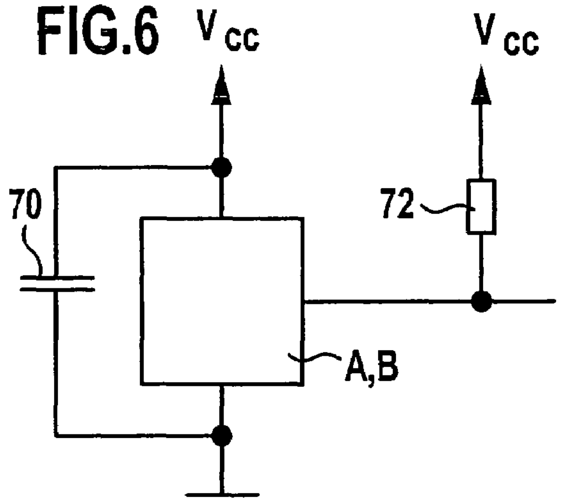
FIG. 6 shows the circuitry of the sensor device according to FIG. 5.

In a variant of this embodiment, as shown in FIG. 5, the Hall sensors 46 are arranged in offset rows A and B, with the Hall sensors of the respective rows A and B connected to one another and to an evaluating device 68. Output connections of the Hall sensors of group A and group B are combined and connected to the evaluating device 68. A capacitor 70 is connected between a supply voltage rail and a ground connection of the Hall sensors 46 for debuffering (FIG. 6). The supply voltage is supplied to the Hall sensors 46 via a resistor 72.

Figure 7:
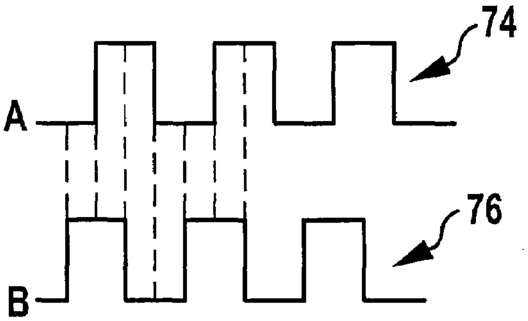
FIG. 7 shows the signal path at the sensor device according to FIG. 5.

The Hall sensors of the adjacent rows A and B are arranged and connected such that corresponding switching signals 74, 76 have a phase shift of, for example, 90°, as shown in FIG. 7. When the magnet 54 which, in particular, is a radially magnetized magnet, moves along the printed circuit board with the Hall sensors 46 arranged in rows A and B, a periodic signal 74 then occurs for the sensors of row A and a phase-shifted periodic signal 76 for the sensors of row B. The number of signal changes in the summation signal and/or subtraction signal can be evaluated by the evaluation device 68 by means of summation and/or subtraction. In turn, the stamp displacement time $T_S$ can be determined therefrom. The direction of movement of the stamp 18 can also be determined. Thus, the impact of the stamp 18 on the object 16 can also be determined by a rebounding of the stamp 18.

The procedure in accordance with the invention is as follows:

The stamp displacement time $T_S$ is measured and stored as the length of time of the movement of the stamp from the starting position 40 until it reaches the object 16. This stamp displacement time $T_S$ is then taken into account when calculating the labeling time $T_E$.

The stamp displacement time is determined and stored, for example, for a certain type of object. With continuous measurement of the stamp displacement time in conjunction, for example, with formation of a mean value, the labeling operation can then be adapted to changing conditions such as, for example, a change in the stamp movement due to temperature changes or slow changes in the height of the objects. The last valid value is stored, for example, as mean value and can then be used as starting value for this object in a subsequent labeling operation.

In the case of objects of different height, which are delivered in an unforeseeable sequence, it is possible, by taking the height of these objects into consideration, to determine the stamp displacement time for the respective height of the objects and to take this into account in future labeling operations.

Owing to the procedure according to the invention, the labeling time $T_E$ for a certain type of object is known, as the stamp displacement time $T_S$ was measured. It can thus be ensured that labels will be placed with a high degree of accuracy on the moved objects 16, as an object 16 moving at speed V moves over the distance $V \times T_E$ during the labeling time, and, therefore, with knowledge of the stamp displacement time $T_S$, the relative position between the object 16 and the stamp 18 when the stamp 18 reaches the object 16 is known.

With knowledge of the stamp displacement time, it is also possible to set a specifically adapted force with which the label can be applied to the object 16 by the stamp 18.

Figure 8:
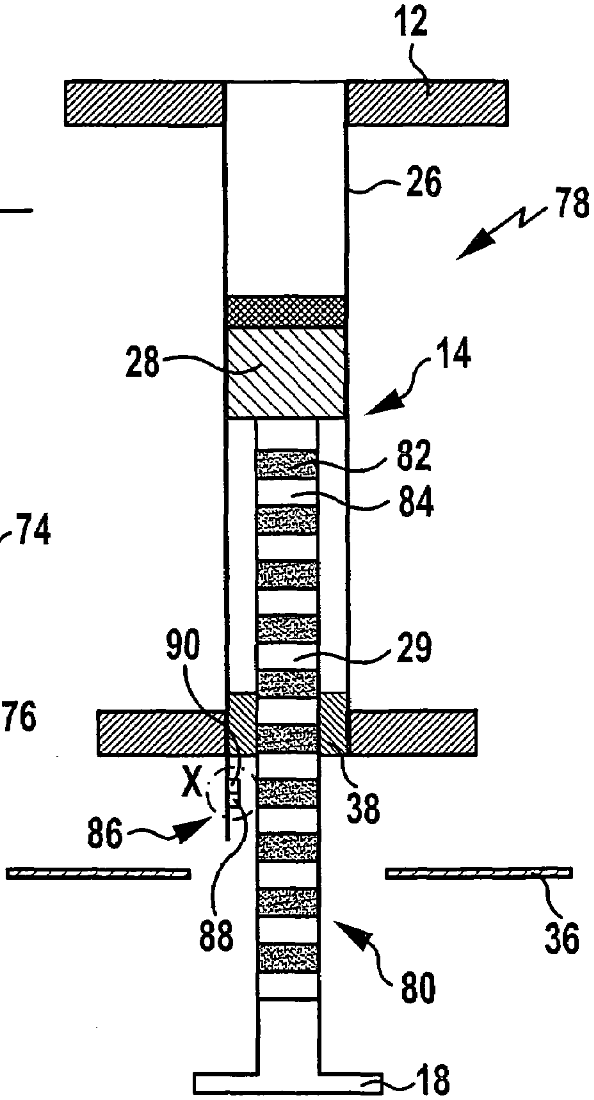
FIG. 8 is a schematic representation of a second embodiment of a labeling device according to the invention.

In a second embodiment of a labeling device according to the invention, which is shown schematically in FIG. 8 and generally designated 78 therein, the stamp device is, in principle, of the same design as described hereinabove. Therefore, like parts have like reference numerals.

In this embodiment, there is arranged on the stamp 18 and, in particular, the piston rod 29, a transducer device 80 which is provided with an optical coding. To this end, there are arranged alternatingly along the stamp 18 (in the direction of displacement 20) areas 82, 84 of different brightness as code fields. The areas 82, 84 preferably have the same length in the direction of displacement 20, i. e., the areas 82 are equally spaced and the areas 84 are likewise equally spaced.

Figure 9:
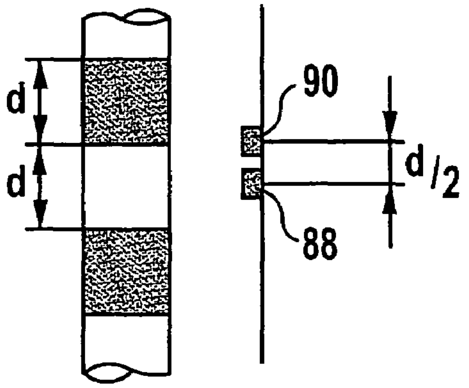
FIG. 9 is an enlarged representation of area X according to FIG. 8.

A sensor device 86 is arranged on the holding device 12 and comprises, for example, two optical sensors 88, 90 (FIG. 9), which are seated in the area between the suction plate 36 and the holding device 12 at its end facing the suction plate 36.

When the stamp 18 moves, the transducer device 80 then moves with it and hence the areas 82 and 84. These areas 82, 84 then travel past the sensors 88, 90, whereupon a signal is produced, via which the stamp displacement time $T_S$ can be determined. When the sensors 88, 90 detect no more changes in brightness, this means that the stamp 18 has reached the object. Proceeding from the starting position 40, the stamp displacement time can then be determined from the sequence of light/dark contrasts.

A dark area 82 and a light area 84 each have an extent d in the direction of the axis of displacement. The two sensors 88, 90 are preferably spaced parallel to the direction of displacement at a distance d/2.

Figure 10:
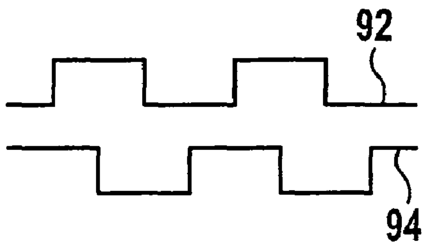
FIG. 10 shows the signal path at the sensor device according to FIGS. 8, 9.

As shown in FIG. 10, during the movement of the stamp a sensor signal 92 of the sensor 90 can be obtained, which is phase-shifted through 90° in comparison with a sensor signal 94 of the sensor 88. In comparison with use of only one sensor, a double resolution is thereby achieved without the areas 82, 84 having to be reduced in size.

In other respects, the labeling device 78 operates as described hereinabove in conjunction with the labeling device 10.

Figure 11:
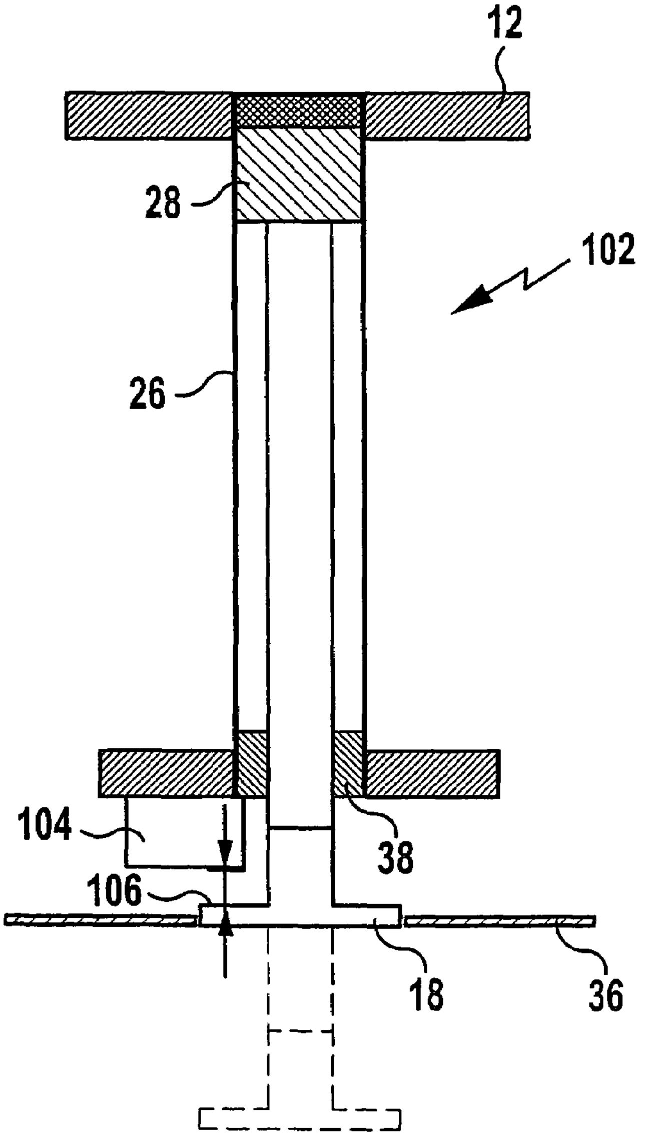
FIG. 11 shows a third embodiment of a labeling device according to the invention.

A third embodiment of a labeling device according to the invention is shown in FIG. 11 and generally designated 102 therein. Again, components identical with those of the first embodiment have identical reference numerals.

A distance sensor 104, which may, for example, be an optical sensor or an inductive sensor or the like, is provided in this embodiment. This distance sensor 104 is fixedly connected to the holding device 12 and directed towards a rear side 106 of the stamp 18 facing the holding device 12. The distance sensor 104 couples with this rear side 106 of the stamp 18, for example, electromagnetically, in order to determine the distance and, in particular, the change with respect to time in the distance between the holding device 12 and the stamp 18.

The distance sensor 104 forms a sensor device. The transducer device may be formed on the distance sensor 104 itself by, for example, the distance sensor transmitting an electromagnetic signal which is reflected by the stamp 18. However, the stamp 18 itself may also form the transducer device.

The coupling between distance sensor 104 and stamp 18 depends on the distance between these and is thus determined by the displacement of the stamp 18. No change in the distance occurs in the starting position 40. The start of the time measurement for the stamp displacement time can then be initiated by a noticeable change in distance occurring.

When the object 16 is reached, no change in distance occurs either, so that the end time can thereby be detected for determining the stamp displacement time. The corresponding time difference then constitutes the stamp displacement time.

In other respects, the labeling device 102 operates as described hereinabove in conjunction with the first and second embodiments.

Figure 12:
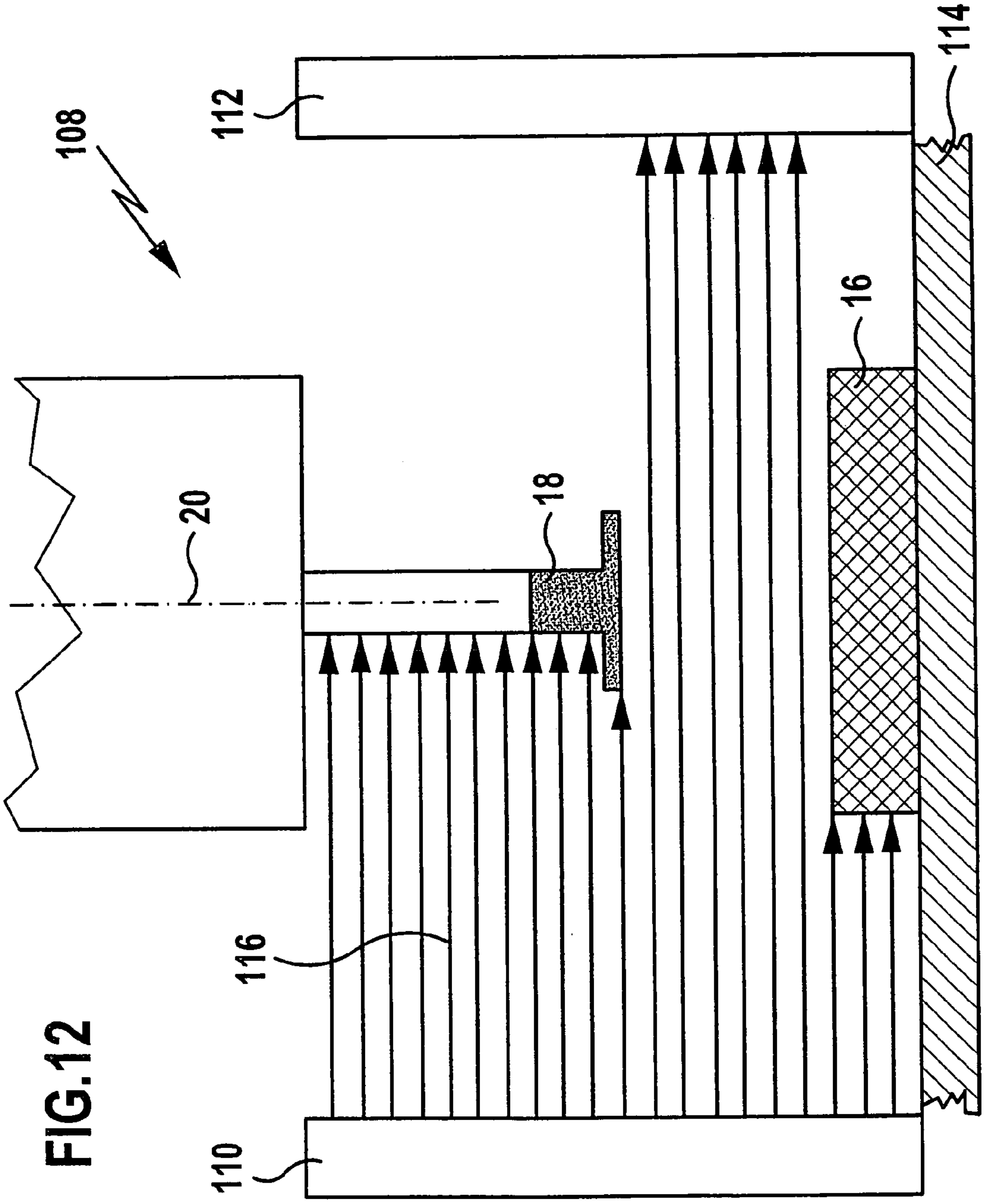
FIG. 12 shows a fourth embodiment of a labeling device according to the invention.

In a fourth embodiment shown schematically in FIG. 12 and generally designated 108 therein, a transducer device 110 comprising, for example, a light grid is provided. This transducer device 110 generates a light field towards a sensor device 112. The transducer device 110 and the sensor device 112 are spaced from each other transversely to a direction of transportation of the object 16. The object 16 is conveyed, for example, on a conveyor belt 114 (in a direction of transportation extending at right angles to the drawing direction in FIG. 12).

The transducer device 110 generates a light field 116 whose height extends over the height of the object 16 and at least the maximum height of the stamp 18 over the conveyor belt 14. The stamp 18 can be immersed into the light field 116.

The transducer device 110 and the sensor device 112 are designed such that the light field is at least partially coverable by the stamp 18 so that the sensor device 112 is shaded. The sensor device 112, which comprises a plurality of light-sensitive sensors spaced from each other in the direction of displacement 20 of the stamp 18, can then determine from the degree of shading the position of the stamp as depth of immersion in the light field 116. The stamp displacement time can, in turn, be determined from detection of a change in the degree of shading.

It is also possible to determine the height of the object in the direction of displacement 20 via the light field 116. The object 16 can also shade the sensor device 112, so that the height parameter of the object can thereby be determined. In particular, when the light grid of the transducer device 110 generates parallel rays of light which lie transversely and, in particular, perpendicularly to the direction of the height of the object 16, the height of the object 16 can then be determined quickly and simply.

In particular, the reaching of the object 16 by the stamp 18 can then be determined in a simple way, namely when complete shading (in relation to the height direction 20) of the sensor device 112 is attained. In this case, the stamp displacement time can then be determined in a simple and direct way.

In other respects, the labeling device 108 operates as described hereinabove with reference to embodiments 10, 78 and 102.

It is also possible to determine the stamp displacement time by the progression of the pressure or the pressure ratios in one of the pressure chambers 30, 32 or in both pressure chambers 30, 32 of the cylinder 26 being measured. It can thereby be determined whether the stamp 18 is still in motion or at rest.

It is also possible to carry out a capacitive measurement of the stamp displacement time by, for example, a capacitance measurement being made between the cylinder 26 and the piston rod 29, with the capacitance changing in dependence upon the position of the stamp 18.

Furthermore, it is possible to provide the cylinder 26 with a winding and to measure the inductive coupling of the piston rod of the stamp 18 via this winding, again, with the inductive coupling changing in dependence upon the position of the stamp.

An acceleration sensor which reacts to the impact of the stamp 18 on the object 16 may also be provided to determine the stamp displacement time.

Alternatively, an acceleration sensor may also be arranged on the displaceable piston rod 29, and the corresponding signals of the acceleration sensor are then passed on in a wireless manner to an evaluating device.

The stamp displacement time may also be determined by evaluating a reaction force of the stamp 18 upon contacting the object 16 by means of a force measuring device such as, for example, a bending rod which is connected to the stamp device 14.

The invention claimed is:

1. Labeling device for moved objects comprising:

a stamp which is displaceably guided and by means of which a label is positionable on an object; and a measuring device for detecting a stamp displacement time;

wherein the stamp displacement time is determined by the length of time of the movement of the stamp towards the object.

2. Labeling device in accordance with claim 1, wherein the stamp displacement time is determined by the length of time for the stamp to move from a starting position to the object.

3. Labeling device in accordance with claim 1, wherein a labeling time is determined by the sum of a system time and the stamp displacement time.

4. Labeling device in accordance with claim 1, wherein the stamp displacement time is continuously measurable by the measuring device.

5. Labeling device in accordance with claim 1, wherein the measuring device detects the stamp displacement time in a contactless manner.

6. Labeling device in accordance with claim 1, wherein the measuring device comprises a sensor device and a transducer device.

7. Labeling device in accordance with claim 6, wherein the sensor device and the transducer device are displaceable relative to each other.

8. Labeling device in accordance with claim 6, wherein the sensor device or the transducer device is arranged stationarily in relation to a holding device for a stamp guide, and the transducer device or the sensor device is displaceable with the stamp.

9. Labeling device in accordance with claim 6, wherein the measuring device detects the stamp displacement time via magnetic coupling between sensor device and transducer device.

10. Labeling device in accordance with claim 9, wherein the transducer device comprises a magnet, and the sensor device comprises a plurality of Hall sensors.

11. Labeling device in accordance with claim 10, wherein the Hall sensors are arranged in at least one row.

12. Labeling device in accordance with claim 11, wherein the Hall sensors are aligned in a row substantially parallel to a direction of displacement of the stamp.

13. Labeling device in accordance with claim 10, wherein the Hall sensors are arranged such that upon movement of the stamp at least one Hall sensor will always supply a switching signal.

14. Labeling device in accordance with claim 10, wherein an evaluating device of the measuring device is connected in such a way that the signal of each individual Hall sensor is evaluatable.

15. Labeling device in accordance with claim 14, wherein the Hall sensors are arranged and connected in such a way that signals associated with adjacent Hall sensors overlap with respect to time.

16. Labeling device in accordance with claim 14, wherein a time detection signal remains in the same switching state during the movement of the stamp.

17. Labeling device in accordance with claim 10, wherein a plurality of rows of Hall sensors are provided, and the Hall sensors are arranged and connected in such a way that phase-shifted switching signals are generatable in different rows.

18. Labeling device in accordance with claim 17, wherein the Hall sensors of a row are jointly connected.

19. Labeling device in accordance with claim 1, wherein sensor device and transducer device are optically coupled.

20. Labeling device in accordance with claim 19, wherein the transducer device is provided with a coding aligned along the direction of movement of the stamp and readable by the sensor device.

21. Labeling device in accordance with claim 20, wherein the coding is arranged stationarily in relation to the stamp.

22. Labeling device in accordance with claim 20, wherein the coding has code fields which are uniformly spaced from one another.

23. Labeling device in accordance with claim 22, wherein the sensor device comprises two optical sensors which are spaced from each other substantially at half of the distance of the code fields.

24. Labeling device in accordance with claim 19, wherein the transducer device comprises a generator for a light field, the stamp is immersible into the light field, and the light field is at least partially shieldable by the stamp in dependence upon the depth of immersion in relation to a sensor device.

25. Labeling device in accordance with claim 24, wherein the shielding by the stamp is detectable with respect to time by the sensor device.

26. Labeling device in accordance with claim 1, wherein a distance sensor is provided for measuring the distance of the stamp from a holding device for the stamp.

* * * * *